July 7, 1959
J. H. HERRERA
2,893,306
COFFEE MAKERS
Filed Nov. 30, 1956
7 Sheets-Sheet 1
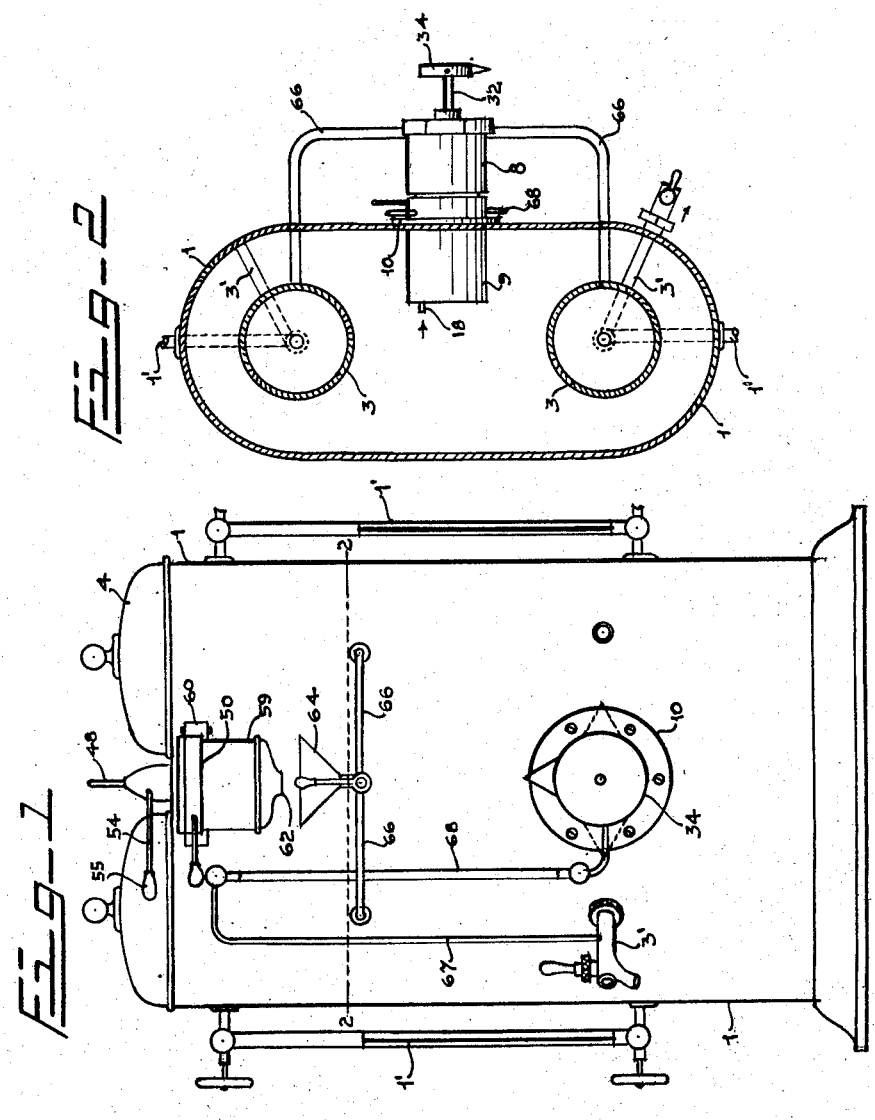

July 7, 1959 J. H. HERRERA 2,893,306
COFFEE MAKERS
Filed Nov. 30, 1956 7 Sheets-Sheet 2

Inventor:
Juan Hernández Herrera,
by Singer, Stern & Carlburg
Attorneys.

July 7, 1959  J. H. HERRERA  2,893,306
COFFEE MAKERS
Filed Nov. 30, 1956  7 Sheets-Sheet 3

Inventor:
Juan Hernández Herrera,
by Singer, Stern & Carlberg
Attorneys.

July 7, 1959
J. H. HERRERA
2,893,306
COFFEE MAKERS
Filed Nov. 30, 1956
7 Sheets-Sheet 4
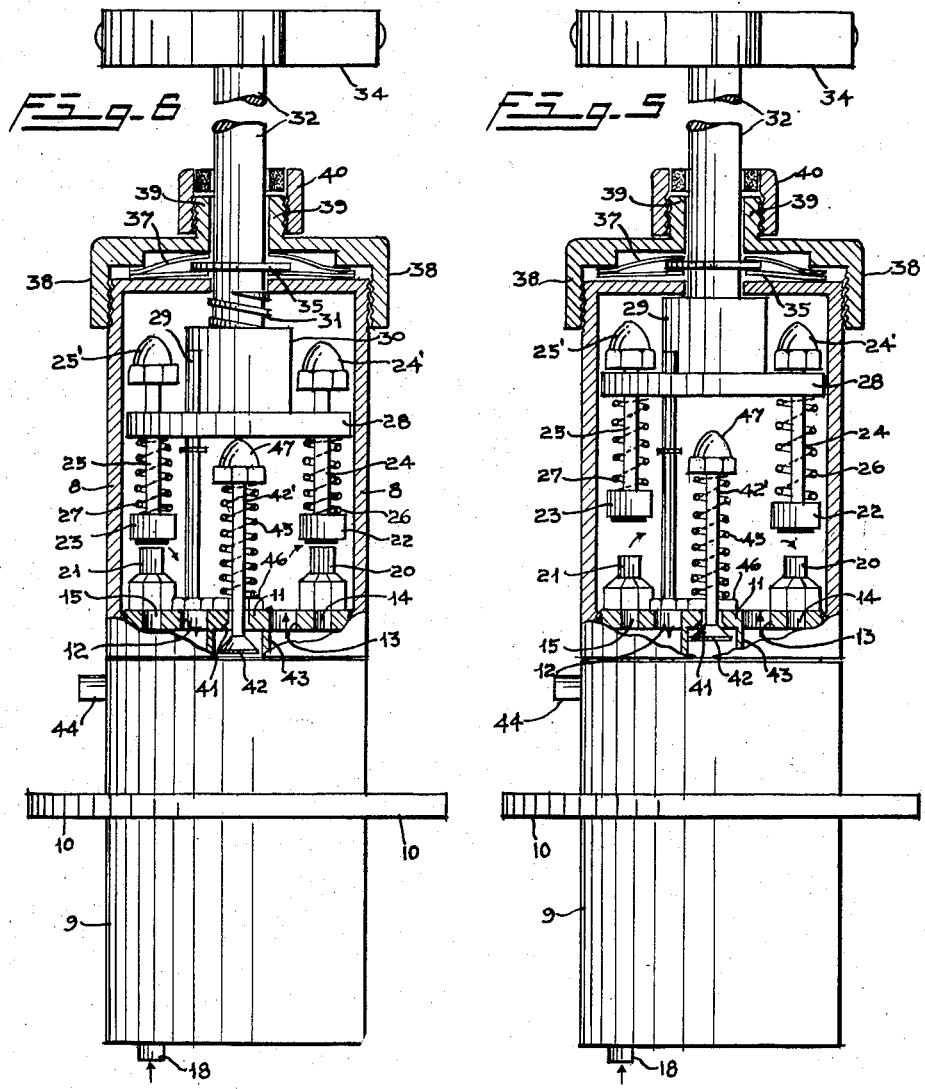

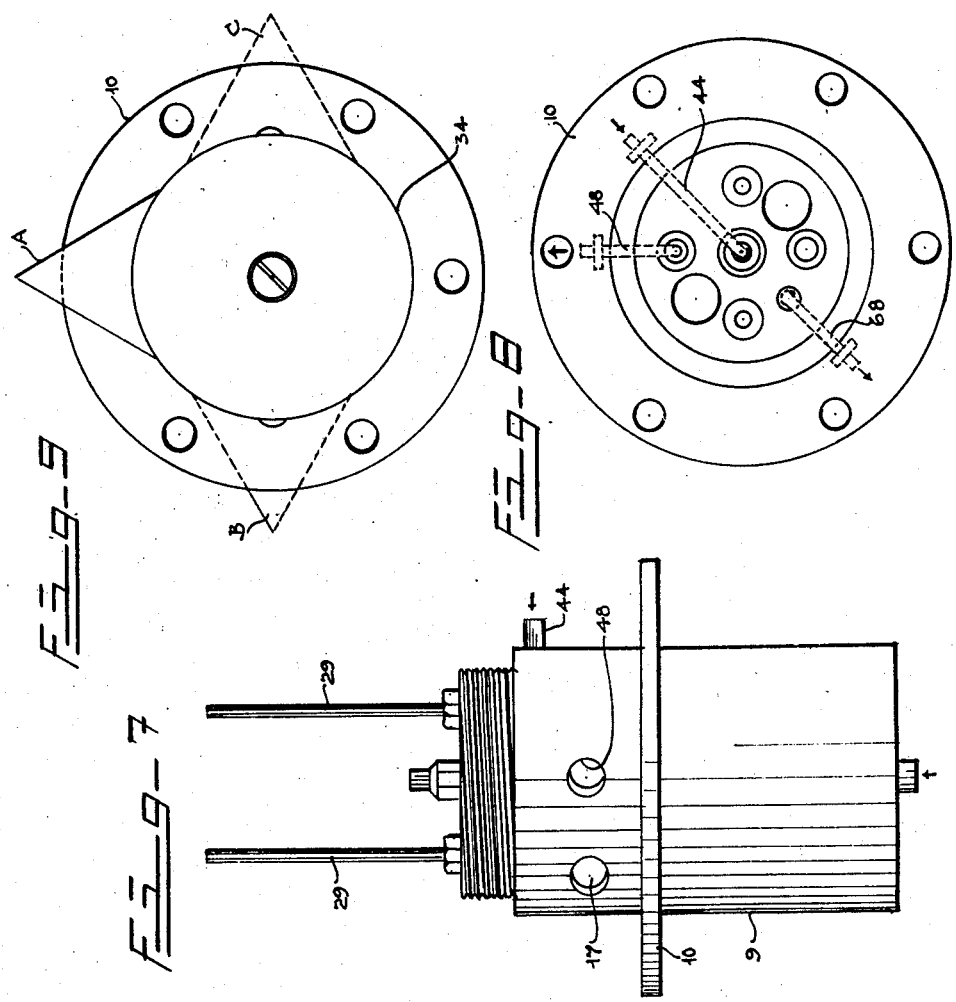

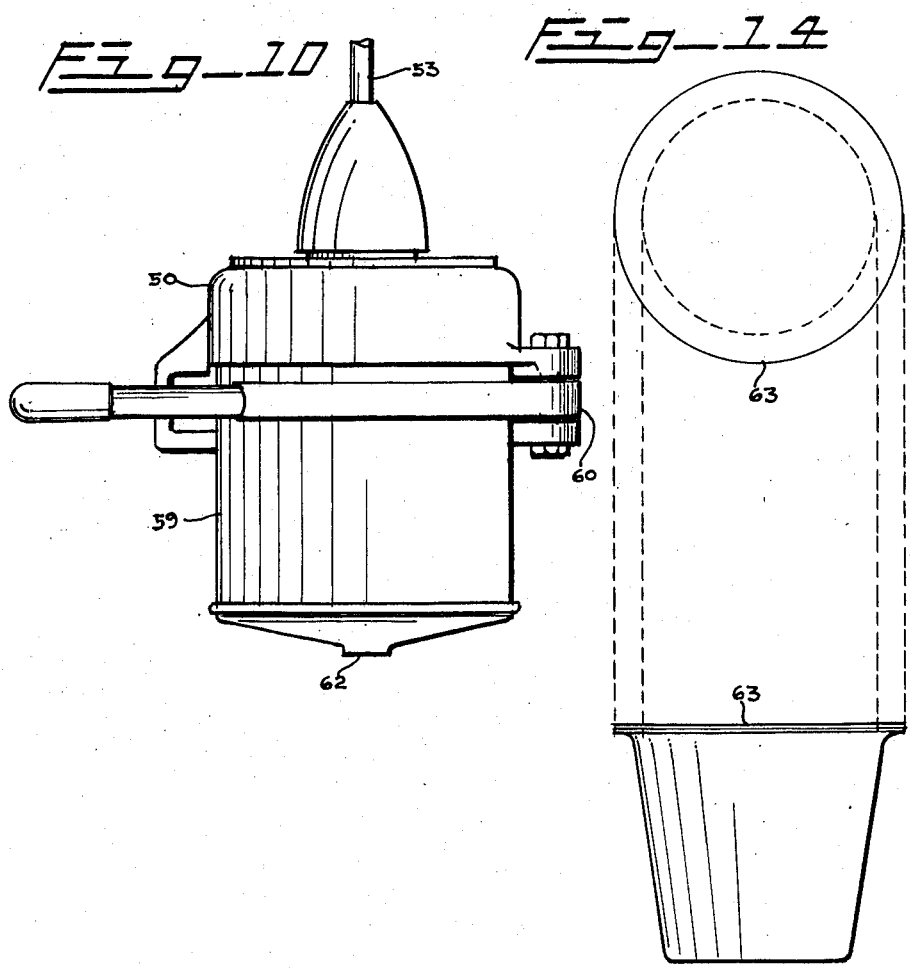

July 7, 1959  J. H. HERRERA  2,893,306
COFFEE MAKERS
Filed Nov. 30, 1956  7 Sheets-Sheet 7
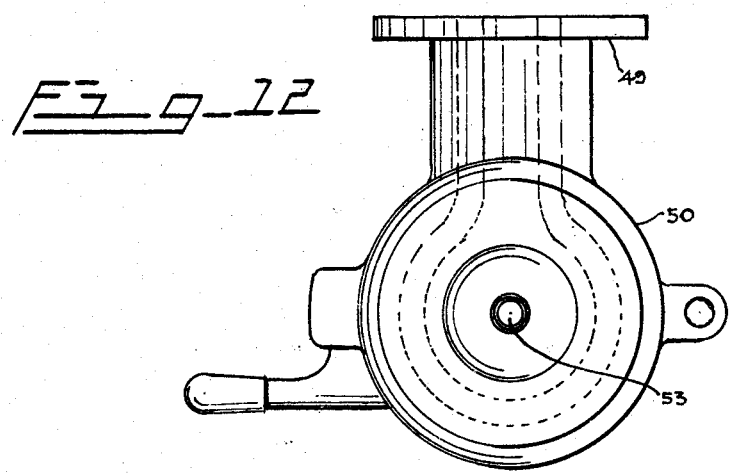
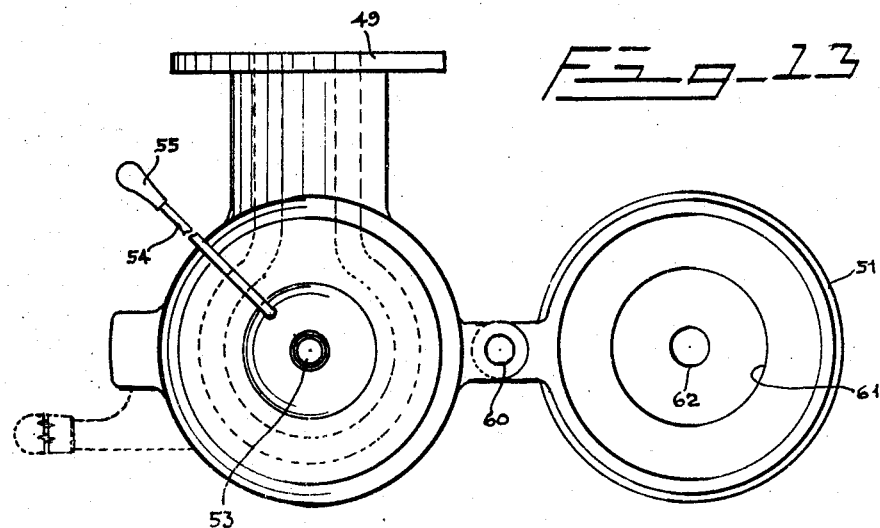
Inventor:
Juan Hernández Herrera,
by Singer, Stern & Carlberg,
Attorneys.

United States Patent Office 2,893,306
Patented July 7, 1959

2,893,306

COFFEE MAKERS

Juan Hernandez Herrera, Havana, Cuba

Application November 30, 1956, Serial No. 625,473

6 Claims. (Cl. 99—302)

This invention relates to coffee makers embodying a hot water boiler and a coffee strainer, and it has for its object to provide a flow control device for hot water for straining a fixed measured volume of coffee whenever necessary. This flow control device comprises a metallic cylinder divided into two threadedly interconnected sections of which one section is provided with an annular flange to secure it in a horizontal position to the lower portion of the hot-water boiler of a coffee maker of the type at present used for making coffee infusions at public establishments, the strainer being mounted adjacent the top front portion of the boiler. Said two cylinder sections have their inner chambers spaced apart by a partition forming the head of the section nearest to the boiler. Said partition has three openings formed therein, a first inlet opening for the passage therethrough of hot water from the boiler via a tube, a second outlet opening for the passage therethrough of inner air into the cylinder through a tube, and a third opening for the passage therethrough of compressed air into the cylinder sections.

The section nearest to the boiler has a side opening connected with a tube for the discharge of water from the chambers forming the cylinder sections into the strainer, the first and second openings having vertical admission tubes which may be opened and closed alternatively through valves having vertical stems which are actuated by coil springs under the push by a disc having a central axle box in the shape of a fixed nut which is caused to move in one direction or the other through a central stem having its lower thread portion forming a proper screw upon which the axle box is screwed, the stem passing through an opening in the head of the cylinder section that is more distant from the boiler and ending outside in a hand wheel to rotate it in either direction. The partition opening for the passage of compressed air is closed beneath by a small box laterally connecting with the compressed air feed tube, and said opening has a conical valve that opens downwardly and is mounted on a vertical stem ending in a round head and having wound thereon a coil spring that keeps it in expanded position to be pressed down by the disc forming part of the central nut so that as the disc is lowered the head of the conical valve stem will be pressed down and the valve will be opened downwardly. The screw stem takes three positions, namely a first or normal position in which the exhaust tube is opened and the boiler water and compressed air inlets are closed, a second position in which both entrance tubes are open while the compressed air inlet valve is closed, and a third position in which both entrance tubes are closed while the compressed air inlet valve is open.

The chambers of both cylinder sections which are intercommunicated by two openings in the partition determine the volume of hot water passing into the strainer for straining coffee. The strainer is divided into two chambers, namely an upper chamber closed by a lid for the strainer vessel and a lower chamber having a perforated bottom adapted to lodge the strainer vessel which encloses a filtering paper cup adapted to contain the powdered coffee and having beneath thereof a frustoconical bottom provided with a central opening for discharging strained coffee into two frusto-conical containers lodged within the boiler and the top portion of which extends outwardly, and each having a cap. The strainer body is pivotally connected to the strainer holder secured at the front portion of the boiler, and the strainer holder has in its thickness an annular conduit in communication through a tube with the hot water within the top portion of the boiler, and through another tube for the passage of cooler water towards the water within the bottom portion of the boiler, to thereby form a thermosiphon proper which by temperature differences keeps the strainer holder permanently hot.

The invention is described with reference to the figures of the accompanying drawings, in which:

Fig. 1 is a front elevational view of a boiler provided with a flow control device at the boiler front.

Fig. 2 is a front horizontal section view on line 2—2 of Fig. 1.

Fig. 5 is a diametral vertical section view of the flow control device in its second position.

Fig. 6 is a diametral vertical section view of the flow control device in its third position.

Fig. 7 is an elevational view of the longer section of the flow control device to show its thread connection with the shorter section thereof.

Fig. 8 is a plan view of the partition separating both sections of the flow control device to show the exhaust tube, the compressed air inlet tube and the outlet tube for hot water into the strainer.

Fig. 9 is an outer end view of the flow control device indicating by angle lines the three positions of same.

Fig. 10 is an outer elevational view of the strainer holder and strainer.

Fig. 12 is a top plan view of the strainer holder and strainer in its closed position.

Fig. 13 is a top plan view of the strainer holder and strainer in its open position.

Figure 3:
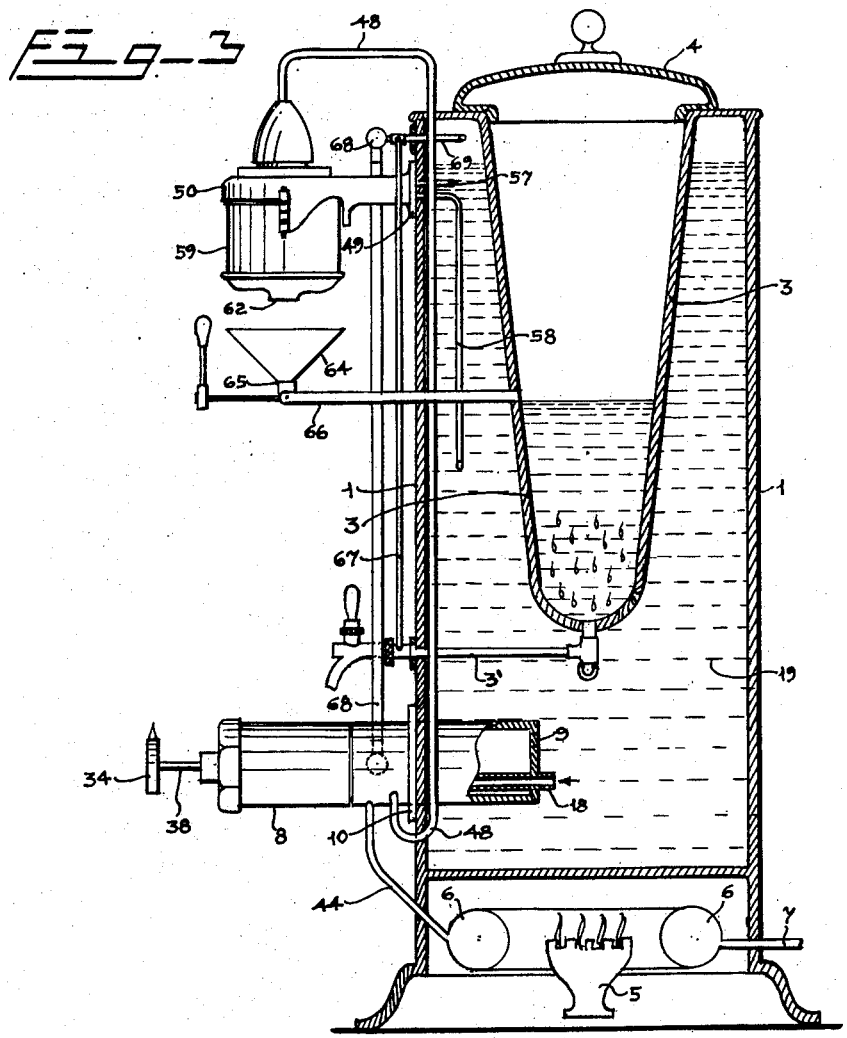
Fig. 3 is a vertical cross-section view of the boiler across one of the two containers for strained coffee.

Fig. 14 comprises an elevational view and a top plan view of the filtering paper cup lodged within the strainer.

In the drawings, 1 indicates a coffee-maker boiler provided with level tubes 1' and two big openings at its top portion from which two conical containers 3 are suspended, each having a round bottom and being provided with an outer cap and a valve tube 3' for the discharge of strained coffee outside the boiler when desired. Beneath the boiler bottom there is formed a chamber having installed therein a burner 5 for heating the boiler and an annular tube of great section 6 in communication through a tube 7 with an air compressor (not shown).

At the front of the bottom portion of the boiler 1 is secured by screws the flow control device which comprises a metallic cylinder divided into a shorter section 8 and a longer section 9 of which the latter penetrates into the boiler through an opening therein and is secured thereto by screws extending through a flange 10 of said section 9. Both cylinder sections 8 and 9 are threadedly interconnected (Fig. 7) and the head of section 9 properly forms a transverse partition 11 having two openings 12 and 13 intercommunicating both sections. Said partitions has two other openings 14 and 15, an elbowed tube 16 leading from said opening 14 and being connected with a threaded lateral opening 17 with which an air outlet tube is connected, and from opening 15 longitudinally leads a tube 18 which extends outside the end of section 9 to directly receive hot water 19 from boiler 1. Entrance tubes 20 and 21 are set on the openings 14 and 15. Closing valves 22 and 23 cooperate with the open ends of said entrance tubes, which valves are fixed at the lower end of vertical stems 24 and 25 slidably mounted under the action of coil springs 26 and 27 wound thereon, through a disc 28 which in turn is slidably mounted and fits on the inner peripheral surface of the cylinder section 8 and is guided on longitudinal rods 29 secured at one end on the partition 11, said disc 28 forming a body together with an innerly thread axle box 30 in the shape of a nut screwed on a screw 31 extending outwardly in a stem 32 that passes across an opening 33 in the center of the free end portion of the cylinder section 8 and ends at a certain distance in a hand wheel or handle 34 to operate the flow control device. The longitudinal stems 24 and 25 end at their top end in round heads 24' and 25'.

To limit the movement of stem 32 between two close positions, the stem 32 has an annular rim 35 engaged between two strap washers, a flat lower washer 36 and a convex upper washer 37 which contact each other at their peripheral edges and are lodged in the inner hole of an innerly thread lid 38 forming a central axle box 39 within which the stem 32 rotates, the lid 38 being screwed on the thread edge of the free end of cylinder section 8 and tightened by a nut 40.

The partition 11 has at its center an opening 41 adapted to be closed and opened by a conical valve 42 lodged in a small closed box 43 wherefrom a transverse tube 44 leads laterally which passes across the wall of the cylinder section 9 to be connected with the compressed air annular feed tube 6. The valve 42 has a stem 42' passing across the opening 41 and extending upwardly, and it has wound thereon a coil spring 45 between a nut 46 and a round head 47 adapted to receive pressure by the disc 28. Hot water is driven from cylinder section 9 into the strainer through tube 48.

Figures 4, 11:
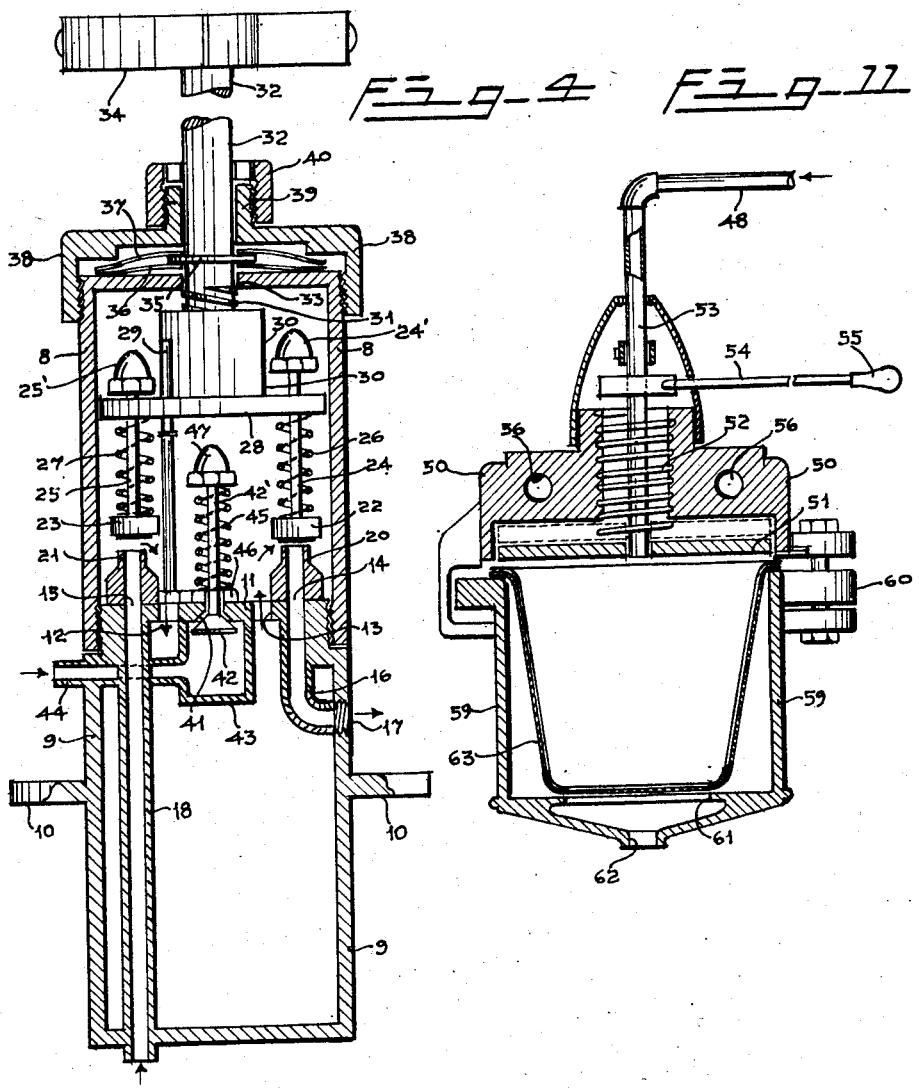
Fig. 4 is a diametral vertical section view of the flow control device in its first position.
Fig. 11 is a diametral vertical section view of the strainer holder and strainer.

The top of the front portion of boiler 1 has secured thereto by screws the flange 49 of a strainer holder 50 which is of a well-known construction and has an inner lid 51 for the strainer vessel, which lid is raised and lowered by a screw 52 forming part of the hollow stem 53 for admission of hot water from the tube 48, the screws 52 being operated by a long horizontal arm 54 provided with a handle 55. The strainer holder 50 has an annular hole 56 in its thickness, which communicates with the water within the top portion of the boiler 1 through tube 57 and communicates with the water within the bottom portion of the boiler through a descending tube 58, thus it forms a proper thermosiphon that keeps the strainer holder 50 hot at all times. The strainer 59 is connected with the strainer holder through a vertical pin hinge 60 that permits to withdraw the strainer which has a bottom with a big central opening 61 and it has beneath another frusto-conical bottom provided with a discharge opening 62 for strained coffee. The strainer vessel 59 lodges a filtering paper cup 63 (Fig. 11) to be loaded with powdered coffee.

Strained coffee is received in a funnel 64 which feeds strained coffee to both containers 3 through a tube 66 provided with a valve 65 and being divided into two branch tubes 66. Each tube 3' communicates through a tube 67 with the upper end of exhaust tube 68 connected to the lateral opening 17 of the cylinder section 9 and said tube 68 has a horizontal branch tube 69 that penetrates the top portion of boiler 1. In this manner the air displaced from both sections of the flow control device is partly forced into the bottom of both containers 3 to remove strained coffee as indicated by the bubbles illustrated in Fig. 3, and the water which might flow through branch 69 would fall into the water within the boiler 1.

The angle lines in Fig. 9 illustrate the three positions, A, B and C, of handle wheel 34 of the bow control device. In the first or normal position A, the valve 22 is seated on the tube 20 to close the opening 14 to the exhaust tube 68 and the valve 23 is open to the boiler. When it is desired to strain coffee, the handle wheel 34 is rotated to the left hand to the second position B, whereupon the valve 22 is lifted by the raise of disc 28, thereby venting the control chamber and permitting the admission of hot water from the boiler which will fill the inner chambers of both cylinder sections 8 and 9, and as the valve 23 is maintained lifted, the inner air leaves through exhaust tube 68. Once both cylinder sections 8 and 9 filled, the handle wheel 34 is rotated to the right hand until the position C, whereupon both valves 22 and 23 will be pressed down by the disc 28, thereby closing the communication with the feed tube 18 for hot water 19 and with exhaust tube 68 and opening the valve 42 which will permit the passage of compressed air fed through tube 6, the hot water contained in both cylinder sections 8 and 9 being thus impelled towards the strainer holder 50 once the handle 55 operated to lower the lid 51 on the top flange of the filtering paper cup 63 resting on the top edge of strainer 59. Once the straining completed, the handle 34 is rotated to the left to the first position, A.

It is obvious that changes may be made in the construction details of the flow control, without thereby altering the essential character of the invention, within the scope of the appended claims.

What I claim is:

1. A pressure feeder device for feeding a predetermined volume of hot water from a steam boiler to a point of use, comprising in combination with a steam boiler; a closed container secured to said boiler having a portion projecting into the water space thereof through an opening in the wall of said boiler; means establishing communication between the water compartment of said boiler and the interior of said container, a vent pipe extending to the top of said boiler a partition in said container having a pair of valve seats secured thereto arranged in spaced apart relation with one of said seats in communication with said last named means and the other valve seat in said partition spaced from said first named valve seat being connected to said vent pipe extending to the top of the boiler, a control shaft mounted in said container, a control member operable by said shaft for reciprocating movement in said container, a pair of spring biased valve elements supported on said control member adapted to cooperate with said valve seats and arranged in one position to close the valve seat communicating with said vent pipe and in another position to open valve seat communicating with the vent pipe, said control member being adapted to move said valve elements into seating engagement with both of said valve seats, a spring biased valve mounted in said partition adapted to be unseated when said control member is in a position to close both of said valve seats, a strainer for coffee making attached to the upper end of said boiler and a pipe connected to a chamber on said partition extending upwardly to said strainer whereby when said spring biased valve is in its open position air under pressure will force the liquid in the control chamber upwardly to the strainer.

2. In a coffee maker, a water boiler, a strainer attached to the upper end of said water boiler, a flow control device comprising a closed cylinder extending through an opening in the peripheral wall of said boiler, a partition wall in said control device, a pipe connecting the partition wall and communicating with the water chamber of said boiler, said pipe being provided with a valve seat, an exhaust pipe connected to said partition having its upper end connected to the steam chamber of the boiler and its lower end fitted with a valve seat, said valve seats being provided with passages, a control shaft in said control device, a control member operably connected to the shaft and mounted for movement toward and away from said valve seat, spring biased valve elements carried by said control member and arranged to open and close said passages through said valve seats and disposed so that in a normal position one of said valve elements will be open to permit water from the boiler to enter the measuring chamber within said closed cylinder, means for supplying compressed air to said cylinder, a chamber connected to said partition having a spring biased normally closed valve, a pipe connecting said chamber to said strainer, the arrangement being such that movement of the control member to seat the valve elements will cause the control member to engage the normally closed spring biased valve and permit air under pressure to force the measured quantity of liquid within the closed cylinder and force the same upwardly to said strainer.

3. In a coffee maker, a boiler, a flow control device including a container extending through an opening in said boiler forming a measuring chamber, a strainer for coffee secured to the upper portion of said boiler, a partition in said flow control device, a pipe attached to said partition and communicating with the water space of said boiler, a valve seat secured to the end of said pipe, an exhaust pipe connected to said partition also having a valve seat attached thereto with its upper end connecting the upper end of said boiler, means for admitting pressure fluid to said flow control device, a control shaft, a control member operably connected to said shaft within said control device, a pair of spring biased valve elements on said control member arranged to cooperate with said valve seats when the control member is moved downwardly and to unseat one of the valve elements when moved upwardly and to unseat both of the valve elements when further movement of said control member is continued, a chamber on said partition, a normally closed spring biased valve member mounted in said partition adapted to close an opening extending from one side of said partition to said chamber, a pipe connecting the upper end of said strainer to said chamber, said control member being arranged to be moved to a first position in which communication with the boiler and hot water as well as the chamber are closed and the communication with the exhaust tube is open, a second position in which the communication with the air chamber is closed and the communication with the boiler hot water and exhaust tube are open, and a third position in which the boiler hot water and the exhaust tube are closed and the normally closed spring biased valve member is open to permit pressure fluid to force the water occupying the closed measuring cylinder upwardly to the coffee strainer.

4. In a coffee maker, a boiler for water, a heater mounted beneath said boiler, a strainer for coffee making attached to the upper end of said boiler, a flow control device for feeding hot water from the boiler to the strainer comprising a closed cylindrical container divided into two threadedly interconnected sections one of which extends through an opening in the boiler and is secured thereto so that a portion of said container extends into the water chamber of said boiler, a partition wall on the outer section dividing said container into two chambers, a pipe extending from the water chamber of said boiler to said partition with its end providing a valve seat, another pipe connected to said partition likewise shaped to provide a valve seat with its other end connected to the steam chamber of said boiler, means for supplying compressed air to the inner chamber, a rotary control member mounted in the outer section of said control device, a control member threaded on said control shaft, means for guiding said control member within said control device, spring biased valve elements supported by said control member and arranged to cooperate with said valve seats, a chamber housing on said partition having an opening communicating with the interior of said control chamber, a valve normally spring biased in a closed position and adapted to be opened by said control member, a pipe connecting said housing to the upper end of said coffee strainer, said rotary control member being arranged to be placed in a first position in which the valve seat of the exhaust pipe is closed and the valve seat connected to the pipe extending into the boiler is open with the normally closed spring biased valve in a closed position, a second position in which the hot water duct from the boiler is open and the valve seat connected to the exhaust pipe is open with the normally closed spring biased valve of said housing likewise closed, and a third position in which the valve seats on the partition for admitting hot water and permitting exhaust are closed and the normally closed spring biased valve for the housing is opened by the control member to permit air pressure to force the liquid trapped in the control chamber upwardly to the coffee strainer.

5. In a coffee maker, a boiler, a coffee strainer holder secured to the upper portion of the boiler, a pair of frustro-conical containers depending from the top portion of the boiler and extending downwardly into the water in said boiler, tubes connected to the bottom portion of each frustro-conical container to discharge coffee exteriorly of the boiler, a valve for controlling flow of coffee through said tubes to the outside of said boiler, a funnel located beneath said coffee strainer for receiving coffee therefrom, a pipe connecting said funnel to each of said frustro-conical containers at a point midway between the upper and lower portions thereof, a valve in said last named pipe for controlling flow of coffee from said strainer to said frustro-conical containers, a flow control device for supplying measured quantities of hot water from said boiler to said coffee strainer including a closed container extending into said boiler having a pipe communicating the water in said boiler with a measuring chamber in said control device, a control member in said device having a pair of spring biased valves one of which is arranged to open and close the pipe communicating with the boiler, while the other is adapted to close an exhaust pipe in communication with the upper end of said boiler, means for supplying air under pressure to said container, a housing in said container having an opening communicating the interior of the housing with the interior of the container, a normally closed spring biased valve for closing said opening, a pipe connecting the housing to the upper end of the strainer and means operable by said control device for opening said normally closed valve and permitting measured quantities of liquid to be forced upwardly by said compressed air to said strainer when said first mentioned valves are in their seated position.

6. In a coffee maker, a boiler for hot water, a strainer for coffee connected to the upper portion of the boiler, a flow control device in communication with said boiler and arranged for supplying measured quantities of water from said control device to said coffee strainer, a conduit connecting said control device and said strainer, means for supplying air pressure to said control device to force the water in said control device upwardly through said conduit to said strainer, a chamber in the lower portion of the boiler, a burner enclosed in said chamber and an annular tube of relatively large sectional diameter surrounding the burner connected to a source of compressed air, and a conduit connecting said annular tube to said control device adapted to heat the compressed air as it is supplied to said control device.

References Cited in the file of this patent

UNITED STATES PATENTS

| | | |
|---|---|---|
| 1,185,073 | Ehrheart | May 30, 1916 |
| 1,662,547 | Urtis | Mar. 13, 1928 |
| 2,205,290 | Herrera | June 18, 1940 |
| 2,396,527 | Osborne | Mar. 12, 1946 |
| 2,451,195 | Brown | Oct. 12, 1948 |
| 2,598,377 | Herrera | May 27, 1952 |

FOREIGN PATENTS

| | | |
|---|---|---|
| 575,276 | Italy | Oct. 22, 1952 |
| 477,547 | Italy | Jan. 24, 1953 |